US012607992B2

(12) United States Patent
Rubner

(10) Patent No.: US 12,607,992 B2
(45) Date of Patent: Apr. 21, 2026

(54) ENCODING OF INTERCOMPONENT INSPECTION REQUIREMENTS

(71) Applicant: Kitov AI Ltd., Kfar Kasim (IL)

(72) Inventor: Joseph Rubner, Petach Tikva (IL)

(73) Assignee: Kitov AI Ltd., Kfar Kasim (IL)

( * ) Notice: Subject to any disclaimer, the term of this patent is extended or adjusted under 35 U.S.C. 154(b) by 522 days.

(21) Appl. No.: 18/019,870

(22) PCT Filed: Aug. 5, 2021

(86) PCT No.: PCT/IL2021/050957
§ 371 (c)(1),
(2) Date: Feb. 6, 2023

(87) PCT Pub. No.: WO2022/029787
PCT Pub. Date: Feb. 10, 2022

(65) Prior Publication Data
US 2023/0297092 A1 Sep. 21, 2023

Related U.S. Application Data

(60) Provisional application No. 63/061,206, filed on Aug. 5, 2020.

(51) Int. Cl.
*G05B 19/418* (2006.01)
(52) U.S. Cl.
CPC ............................. *G05B 19/41875* (2013.01)
(58) Field of Classification Search
CPC ............................................... G05B 19/41875
See application file for complete search history.

(56) References Cited

U.S. PATENT DOCUMENTS

| | | |
|---|---|---|
| 8,131,055 B2 | 3/2012 | Clarke et al. |
| 2015/0012171 A1 | 1/2015 | Richter et al. |
| | (Continued) | |

FOREIGN PATENT DOCUMENTS

| | | |
|---|---|---|
| CN | 107408297 | 11/2017 |
| CN | 107562015 | 1/2018 |
| | (Continued) | |

OTHER PUBLICATIONS

Supplementary European Search Report and the European Search Opinion Dated Jul. 23, 2024 From the European Patent Office Re. Application No. 21852908.9. (10 Pages).

(Continued)

*Primary Examiner* — Gary Collins

(57) ABSTRACT

Assembly-level properties defined by a manufactured product's assembly tree analyzed as trigger predicates to assist identification (i.e., selection and/or preparation) of inspection requirements for the manufactured product. Particular emphasis is placed on hierarchical relationships—assembly identification, effects of manufacturing on the visibility/ accessibility of an assembly to inspection, and using assembly-level semantics to trigger inspection requirements. The identified inspection requirements are optionally open (semantic) or closed. In some embodiments, identified inspection requirements are provided to an automatic inspection planning system configured to generate an inspection plan, the actions of which said plan fulfill the inspection requirements.

24 Claims, 5 Drawing Sheets

(56) References Cited

U.S. PATENT DOCUMENTS

Figure 1A:
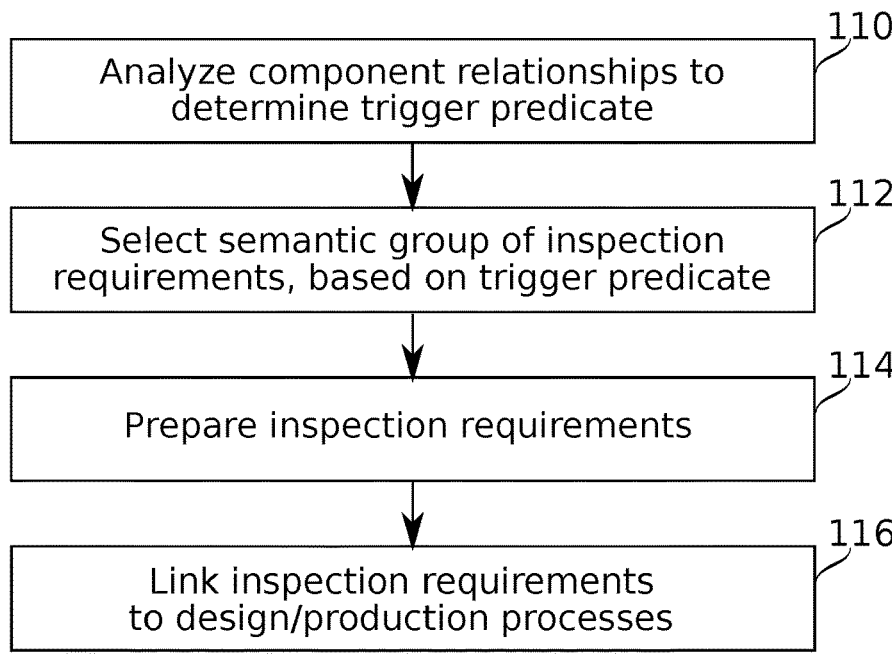

| | | | |
|---|---|---|---|
| 2016/0370165 A1 | 12/2016 | Kelley et al. | |
| 2017/0153967 A1 | 6/2017 | Kalech et al. | |
| 2018/0239334 A1* | 8/2018 | Tramel, Jr. ............. | G01B 21/04 |
| 2018/0322694 A1* | 11/2018 | Byers ...................... | G06T 17/05 |
| 2018/0349518 A1 | 12/2018 | Byers et al. | |

FOREIGN PATENT DOCUMENTS

| | | |
|---|---|---|
| CN | 111027134 | 4/2020 |
| EP | 3224806 | 6/2016 |
| JP | 2018-506127 | 3/2018 |
| WO | WO 2016/083897 | 6/2016 |
| WO | WO 2019/156783 | 8/2019 |
| WO | WO 2020/110119 | 6/2020 |
| WO | WO 2022/029787 | 2/2022 |

OTHER PUBLICATIONS

Liu et al. "A Framework for Model-Based Integrated Inspection", The International Journal of Advanced Manufacturing Technology, 103(9): 3643-3665, XP036847350, May 8, 2019.

Rui et al. "An Effective Subpart Retrieval Approach of 3D Cad Models for Manufacturing Process Reuse", Computers in Industry, 67: 38-53, XP029188297, Dec. 31, 2014.

Yang et al. "A Knowledge-Based System for Quality Analysis in Model-Based Design", Journal of Intelligent Manufacturing, 31(6): 1579-1606, XP037179252, Jan. 24, 2020.

International Preliminary Report on Patentability Feb. 16, 2023 From the International Bureau of WIPO Re. Application No. PCT IL2021/050957. (6 Pages).

International Search Report and the Written Opinion Dated Nov. 23, 2021 From the International Searching Authority Re. Application No. PCT/IL2021/050957. (12 Pages).

DMSC "Quality Information Framework (QIF)—An Integrated Model for Manufacturing Quality Information", Digital Metrology Standard Consortium, DMSC, QIF Version 3.0, ANSI/DMSC QIF 3.0—2018, p. 1-537, 2018. (Part 1).

DMSC "Quality Information Framework (QIF)—An Integrated Model for Manufacturing Quality Information", Digital Metrology Standard Consortium, DMSC, QIF Version 3.0, ANSI/DMSC QIF 3.0—2018, p. 1-537, 2018. (Part 2).

DMSC "Quality Information Framework (QIF)—An Integrated Model for Manufacturing Quality Information", Digital Metrology Standard Consortium, DMSC, QIF Version 3.0, ANSI/DMSC QIF 3.0—2018, p. 1-537, 2018. (Part 3).

Notice of Reasons for Rejection Dated Jun. 24, 2025 From the Japan Patent Office Re. Application No. 2023-508519 and its Translation into English. (5 Pages).

Notification of Office Action and Search Report Dated Oct. 23, 2025 From the State Intellectual Property Office of the People's Republic of China Re. Application No. 202180067069.4 with Its Summary and Machine Translation Into English. (20 Pages).

* cited by examiner

302
Car   a1

304
Body   c1

306
Front axle with wheels   c2

308
Rear axle with wheels   c3

310
Body   p3

312
Axle with wheels   a2

314
Axle   c4

316
Left wheel   c5

318
Right wheel   c6

324
Axle   p2

322
Wheel   p1

230
Hierarchy node

232
Trigger param. specification 223
not trigger predicate

210
Has component(s)?

no yes

212
At correct level(s)?

no yes 221
trigger predicate

ENCODING OF INTERCOMPONENT INSPECTION REQUIREMENTS

RELATED APPLICATIONS

This application is a National Phase of PCT Patent Application No. PCT/IL2021/050957 having International filing date of Aug. 5, 2021, which claims the benefit of priority under 35 USC § 119(e) of U.S. Provisional Patent Application No. 63/061,206 filed on Aug. 5, 2020. The contents of the above applications are all incorporated by reference as if fully set forth herein in their entirety.

FIELD AND BACKGROUND OF THE INVENTION

The present invention, in some embodiments thereof, relates to the field of inspection and more particularly, but not exclusively, to automated inspection for manufacturing quality control.

In many industries, such as those involving manufactured products, it can be advantageous to inspect such products to ensure they are free of defects. Such inspections are frequently conducted manually (e.g., by human inspectors) which can result in various inaccuracies and inefficiencies.

SUMMARY OF THE INVENTION

According to an aspect of some embodiments of the present disclosure, there is provided a method of defining visual inspection requirements for a manufactured product, the method including: accessing a model-based definition (MBD) including a design model of the manufactured product; identifying inspection requirements for components of the manufactured product, based on automatic analysis of relationships between components specified by the MBD; and encoding the identified inspection requirements for use in machine planning of visual inspection of the manufactured product.

According to some embodiments of the present disclosure, the MBD specifies hierarchical relationships of components specified in the design model, and the identifying inspection requirements is based on automatic analysis identifying particular hierarchical relationships of components specified by the MBD.

According to some embodiments of the present disclosure, the hierarchical relationships of components correspond to relationships among assemblies of the manufactured product.

According to some embodiments of the present disclosure, the identifying inspection requirements is based on automatic analysis identifying component geometrical relationships specified by the MBD.

According to some embodiments of the present disclosure, the identifying inspection requirements is based on automatic analysis identifying a pattern of component properties specified by the MBD.

According to some embodiments of the present disclosure, the method includes generating a visual inspection plan satisfying the inspection requirements; and carrying out the visual inspection plan on at least one instance of the manufactured product.

According to some embodiments of the present disclosure, the inspection requirements comprise open inspection requirements specifying a quality concern for inspection of one or more components specified by the MBD, without specification of characteristics or actions corresponding to the quality concern.

According to some embodiments of the present disclosure, the open requirement is a semantic requirement.

According to some embodiments of the present disclosure, the generating the visual inspection plan includes converting the open inspection requirements into corresponding closed inspection requirements which specify characteristics of the components and measurement actions for those characteristics.

According to some embodiments of the present disclosure, the converting uses the MBD.

According to some embodiments of the present disclosure, the generating the visual inspection plan includes using hierarchical relationships specified by the MBD to determine a stage at which to perform actions that satisfy the inspection requirement.

According to some embodiments of the present disclosure, the generating the visual inspection plan includes using geometrical information specified by the MBD to determine a stage at which to perform actions that satisfy the inspection requirement.

According to some embodiments of the present disclosure, automated processing determines which information to extract from the MBD for the converting, based on the open inspection requirements.

According to some embodiments of the present disclosure, the inspection requirements comprise only open inspection requirements.

According to some embodiments of the present disclosure, the inspection requirements comprise closed inspection requirements specifying characteristics and measurement actions to measure the characteristics performed when carrying out the visual inspection plan.

According to some embodiments of the present disclosure, the encoding includes inserting inspection-specifying data elements into the MBD.

According to some embodiments of the present disclosure, the MBD is specified as one or more QIF files, and the inspection-specifying data elements are defined using references to elements of the one or more QIF files.

According to some embodiments of the present disclosure, the inspection-specifying data elements are defined as XML.

According to some embodiments of the present disclosure, the method includes adjusting design specifications in the MBD, based on the inserted inspection-specifying data elements.

According to some embodiments of the present disclosure, the method includes adjusting a manufacturing plan, based on the inserted inspection-specifying data elements.

According to some embodiments of the present disclosure, the identifying includes selecting inspection requirements from a predefined inspection requirements library, based on analysis of hierarchical relationships specified between components defined in the MBD.

According to some embodiments of the present disclosure, the analysis of the MBD document hierarchy includes identifying a predicate trigger which is a condition for the selection of the selected inspection requirements.

According to some embodiments of the present disclosure, the identifying the predicate trigger includes identification of an assembly including a predetermined configuration of components.

According to some embodiments of the present disclosure, identifying the predicate trigger includes determination of the visibility of components within an assembly.

According to some embodiments of the present disclosure, identifying the predicate trigger includes determination of the accessibility of components within an assembly.

According to some embodiments of the present disclosure, identifying the predicate trigger includes analysis of textual content within a specification of a design hierarchy specified by the MBD.

According to some embodiments of the present disclosure, a conditioning input modifies the identifying the predicate trigger to change how the identifying is performed.

According to some embodiments of the present disclosure, the conditioning input includes a manually provided input.

According to some embodiments of the present disclosure, the conditioning input includes data encoding an inspection policy.

According to some embodiments of the present disclosure, the conditioning input comprises data describing a factory condition related to one or more of part inventory, part source, tooling state, tooling availability, state of worker training, and labor allocation.

According to some embodiments of the present disclosure, the method includes modifying the selecting according to a conditioning input.

According to some embodiments of the present disclosure, the modifying includes adding, removing, or modifying a particular inspection requirement.

According to some embodiments of the present disclosure, the conditioning input includes a manually provided input.

According to some embodiments of the present disclosure, the conditioning input includes data encoding an inspection policy.

According to some embodiments of the present disclosure, the conditioning input describes a factory condition related to one or more of part inventory, part source, tooling state, tooling availability, state of worker training, and labor allocation.

According to some embodiments of the present disclosure, the identifying includes preparing the selected inspection requirements.

According to some embodiments of the present disclosure, the MBD documentation includes one or more QIF files.

According to some embodiments of the present disclosure, the inspection requirements are open inspection requirements selected based on an identification in the MBD of a trigger predicate which denominates an assembly as belonging to a class for which a semantic inspection agent is available.

According to an aspect of some embodiments of the present disclosure, there is provided a system for defining visual inspection requirements for a manufactured product, the system including a computer processor and memory, wherein the computer processor is configured to access instructions in the memory medium which instruct it to: access, from the memory, a model-based definition (MBD) including a design model of the manufactured product; identify inspection requirements for components of the manufactured product, based on automatic analysis of relationships between components specified by the MBD; and encode the identified inspection requirements for use in machine planning of visual inspection of the manufactured product.

According to some embodiments of the present disclosure, the MBD includes one or more QIF-formatted files.

According to some embodiments of the present disclosure, the identified inspection requirements are encoded as XML files.

According to some embodiments of the present disclosure, the wherein the MBD specifies hierarchical relationships of components specified in the design model, and the computer processor identifies inspection requirements by identifying particular hierarchical relationships of components specified by the MBD.

According to some embodiments of the present disclosure, the hierarchical relationships of components correspond to relationships among assemblies of the manufactured product.

Unless otherwise defined, all technical and/or scientific terms used herein have the same meaning as commonly understood by one of ordinary skill in the art to which the present disclosure pertains. Although methods and materials similar or equivalent to those described herein can be used in the practice or testing of embodiments of the present disclosure, exemplary methods and/or materials are described below. In case of conflict, the patent specification, including definitions, will control. In addition, the materials, methods, and examples are illustrative only and are not intended to be necessarily limiting.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system" (e.g., a method may be implemented using "computer circuitry"). Furthermore, some embodiments of the present disclosure may take the form of a computer program product embodied in one or more computer readable medium(s) having computer readable program code embodied thereon. Implementation of the method and/or system of some embodiments of the present disclosure can involve performing and/or completing selected tasks manually, automatically, or a combination thereof. Moreover, according to actual instrumentation and equipment of some embodiments of the method and/or system of the present disclosure, several selected tasks could be implemented by hardware, by software or by firmware and/or by a combination thereof, e.g., using an operating system.

For example, hardware for performing selected tasks according to some embodiments of the present disclosure could be implemented as a chip or a circuit. As software, selected tasks according to some embodiments of the present disclosure could be implemented as a plurality of software instructions being executed by a computer using any suitable operating system. In some embodiments of the present disclosure, one or more tasks performed in method and/or by system are performed by a data processor (also referred to herein as a "digital processor", in reference to data processors which operate using groups of digital bits), such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or user input device such as a keyboard or mouse are optionally provided as well. Any of these implementations are referred to herein more generally as instances of computer circuitry.

Any combination of one or more computer readable medium(s) may be utilized for some embodiments of the present disclosure. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium may also contain or store information for use by such a program, for example, data structured in the way it is recorded by the computer readable storage medium so that a computer program can access it as, for example, one or more tables, lists, arrays, data trees, and/or another data structure. Herein a computer readable storage medium which records data in a form retrievable as groups of digital bits is also referred to as a digital memory. It should be understood that a computer readable storage medium, in some embodiments, is optionally also used as a computer writable storage medium, in the case of a computer readable storage medium which is not read-only in nature, and/or in a read-only state.

Herein, a data processor is said to be "configured" to perform data processing actions insofar as it is coupled to a computer readable memory to receive instructions and/or data therefrom, process them, and/or store processing results in the same or another computer readable storage memory. The processing performed (optionally on the data) is specified by the instructions. The act of processing may be referred to additionally or alternatively by one or more other terms; for example: comparing, estimating, determining, calculating, identifying, associating, storing, analyzing, selecting, and/or transforming. For example, in some embodiments, a digital processor receives instructions and data from a digital memory, processes the data according to the instructions, and/or stores processing results in the digital memory. In some embodiments, "providing" processing results comprises one or more of transmitting, storing and/or presenting processing results. Presenting optionally comprises showing on a display, indicating by sound, printing on a printout, or otherwise giving results in a form accessible to human sensory capabilities.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments of the present disclosure may be described below with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

BRIEF DESCRIPTION OF THE SEVERAL
VIEWS OF THE DRAWINGS

Some embodiments of the present disclosure are herein described, by way of example only, with reference to the accompanying drawings. With specific reference now to the drawings in detail, it is stressed that the particulars shown are by way of example, and for purposes of illustrative discussion of embodiments of the present disclosure. In this regard, the description taken with the drawings makes apparent to those skilled in the art how embodiments of the present disclosure may be practiced.

Figure 1B:
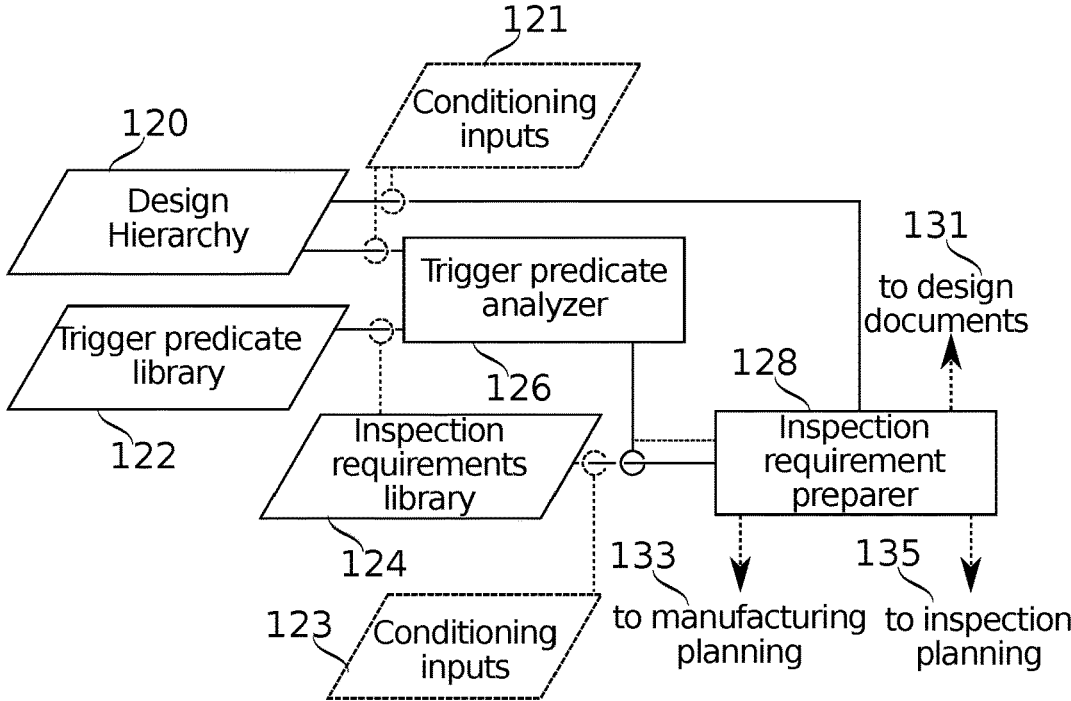
Figure 1C:
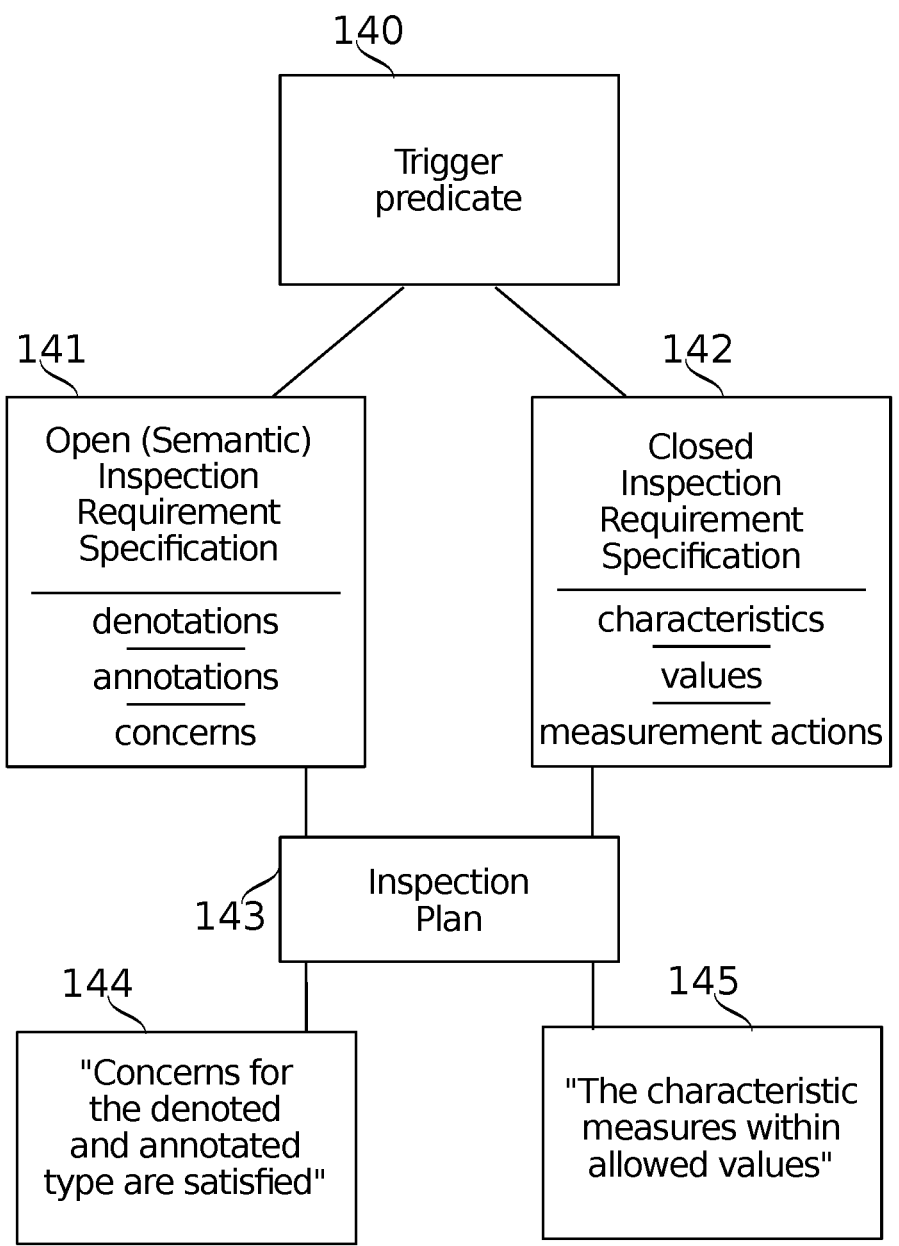
Figures 2A, 2B:
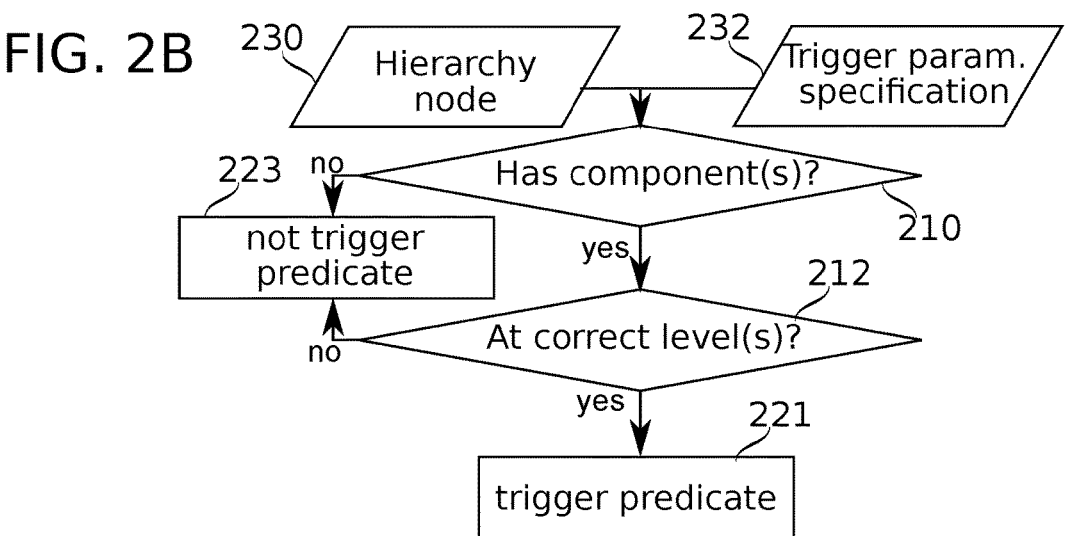
Figure 2C:
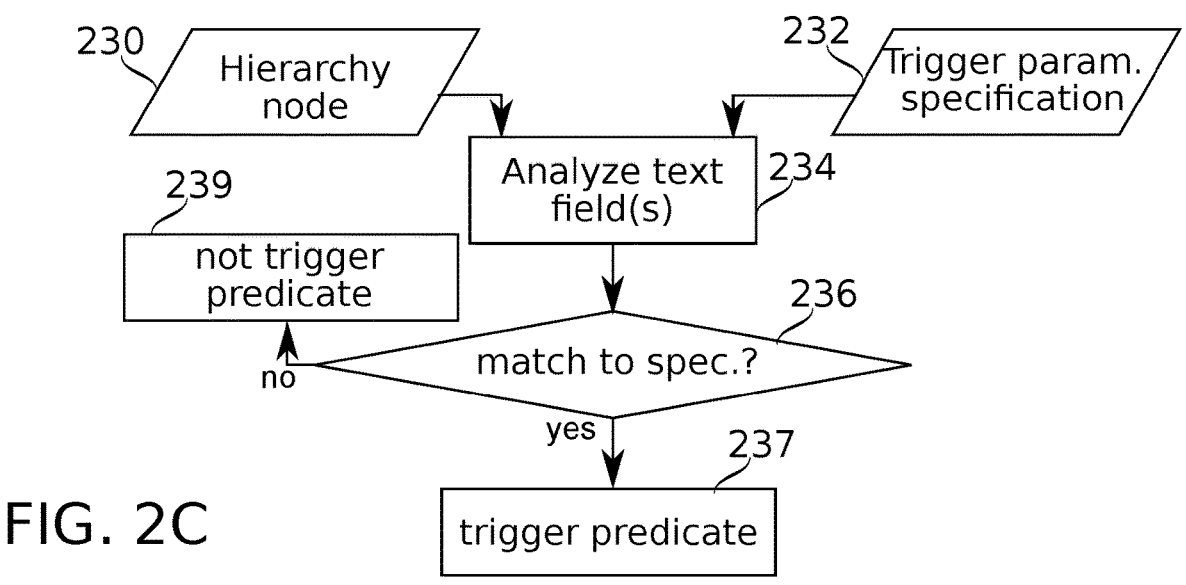
Figure 3:
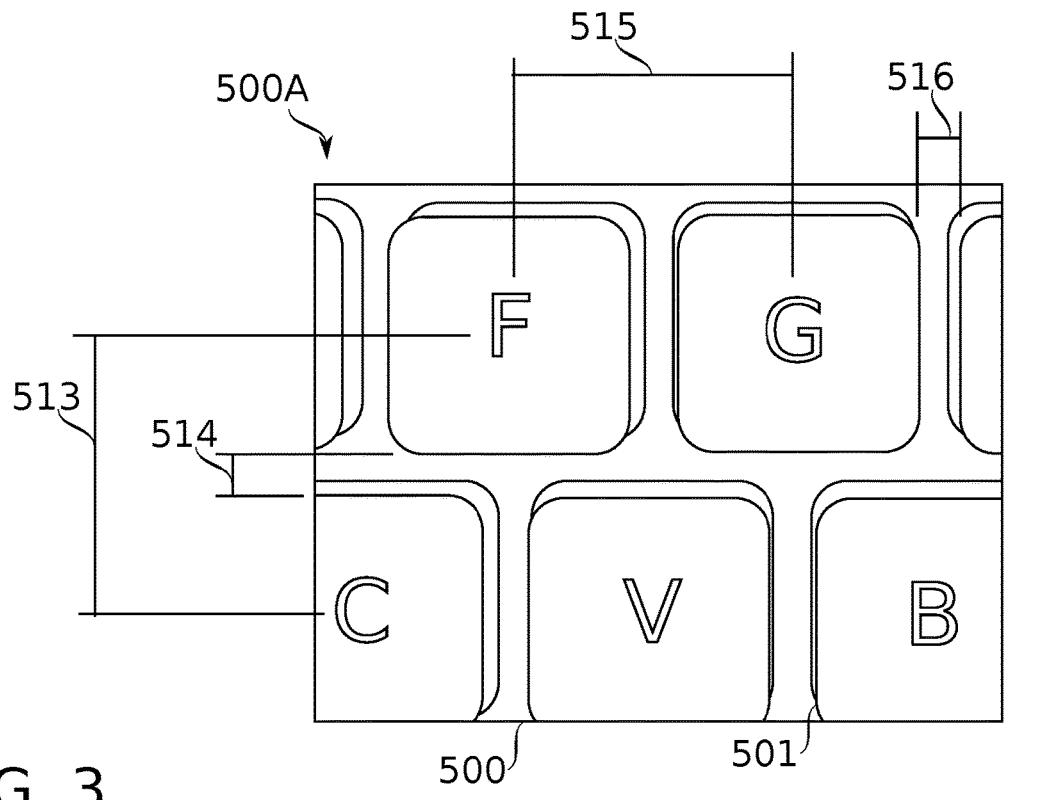
Figure 4:
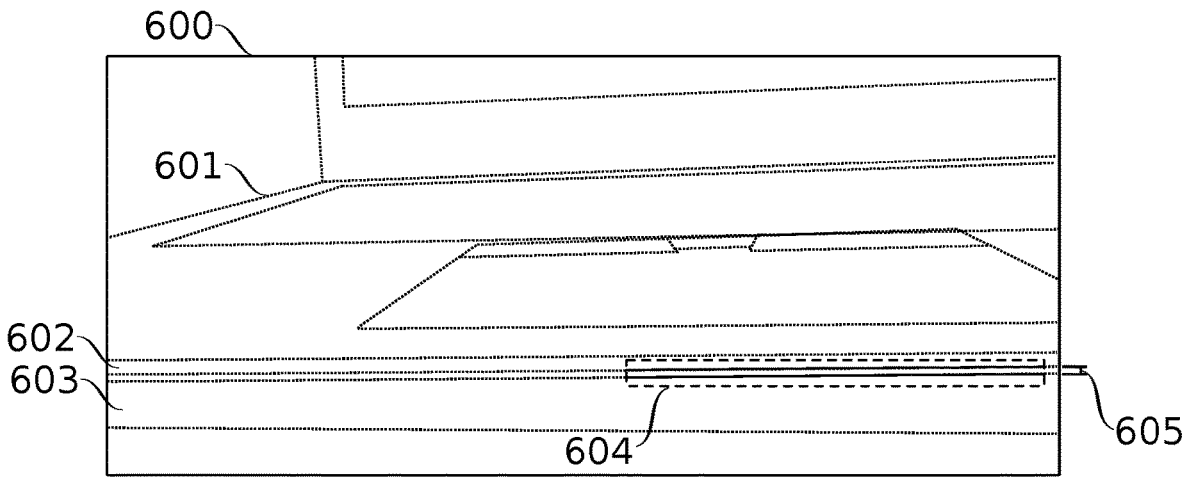

In the drawings:

FIG. 1A schematically illustrates a method of automatically identifying inspection requirements, according to some embodiments of the present disclosure;

FIG. 1B schematically illustrates a system for automatic identification of inspection requirements based on an assembly tree for a manufactured product, according to some embodiments of the present disclosure;

FIG. 1C schematically compares open and closed inspection requirement specifications, according to some embodiments of the present disclosure;

FIG. 2A schematically illustrates aspects of model-based design documents, according to some embodiments of the present disclosure;

FIG. 2B schematically illustrates a method of identifying a component-based trigger predicate within an assembly tree, according to some embodiments of the present disclosure;

FIG. 2C schematically illustrates a method of identifying a text-based trigger predicate within an assembly tree, according to some embodiments of the present disclosure;

FIG. 3 schematically represents an image of an inspected portion of a keyboard, according to some embodiments of the present disclosure; and FIG. 4 schematically represents an image of a portion of a computer case, according to some embodiments of the present disclosure.

DESCRIPTION OF SPECIFIC EMBODIMENTS OF THE INVENTION

The present invention, in some embodiments thereof, relates to the field of inspection and more particularly, but not exclusively, to automated inspection for manufacturing quality control.

Overview

Automated Selection of Inspection Requirements

A broad aspect of some embodiments of the present disclosure relates to automatic selection and/or preparation of visual inspection requirements for a manufactured product, using information extracted from the design/manufacturing documentation of the manufactured product. In some embodiments, this is enabled by the use of systems and/or methods whereby:

A Library of Potential Inspection Requirements Semantically Groups the Inspection Requirements According to One or More Trigger Predicates.

For example, a grouping may effectively define that "for things that Y, inspect for X1, X2 . . . ". In this formulation, "Y" is the trigger predicate, and "X1, X2 . . . " is the group of inspection requirements. The trigger predicates and/or inspection requirements may furthermore be parameterized, and parameters optionally provided according to inputs gathered, for example: from manual input, from quality policies, and/or from the design/manufacturing documentation (for example, geometry and/or inter-component relationships specified by the design/manufacturing documentation).

There are Provided Automated Capabilities for Identifying the Trigger Predicates within Design and/or Manufacturing Documentation.

For example, a part (that is, an item which is to be used as a component of the manufactured product having specific attributes such as its 3-D pose within the manufactured product) may attach to inspection requirements because of trigger predicates such as: what it is, what it has, and/or how it relates to one or more other components. Triggering predicates are preferably determined from documentation (e.g., annotated, and optionally hierarchically organized 3-D models) that is available as a product of design/manufacturing planning.

The identified trigger predicates are used to associate the semantically grouped inspection requirements to a process of quality inspection for the manufactured product, e.g., as the requirements fulfilled by an inspection plan.

In some embodiments, the inspection performed is more particularly visual inspection, e.g., inspection of a manufactured item performed on the basis of its appearances in images. This may be distinguished, for example, from metrology inspection, wherein distance-based measurements are performed, e.g., by use of a distance measuring device operating by direct contact with the item being inspected.

Trigger Predicates

Herein, a trigger predicate is any fact (or complex of facts) within a given information set which is recognized within the context of some process to imply a link (semantic association) to semantic information (discussed below).

Trigger predicates may be further characterized according to label-like and property-like aspects. As an example simplified for illustrative purposes, there may be considered a process that manipulates a mixed collection of objects consisting of red balls and blue cubes. Within the context of that process: if a red object is identified, it is also a ball. "Red", in this context, may be used as a trigger predicate for recognizing that the object has the semantic properties appropriate to manipulation of a ball. For the purposes of the process, the object "is a ball", with ball-like properties relevant to the manipulation (for example, it rolls, and is largest half-way up its height). Alternatively, a trigger predicate could be more inherent to the semantics it links to, like "has a curved profile". This illustrates how trigger predicates may have a contingent or label-like aspect ("being red" has little to do with roundness, but it nevertheless gives to all the round objects in the example a selectable tag), or an inherent/property-like aspect ("being curved" is a consequence of being a round object). Both aspects, as well as trigger predicates that may mix the two aspects, are optionally used in some embodiments of the present disclosure.

The present disclosure relates to processes for inspecting manufactured products. In some embodiments, trigger predicates are identified from aspects of the design/manufacturing documentation which exist to specify the manufactured product, or for another use apart from quality inspection planning as such. The trigger predicates may document "properties" of the product (e.g., of product geometry and/or composition), may comprise "labels" (e.g., names of components and/or assemblies of components), or may comprise some combination thereof (e.g., insofar at least as textual documentation commonly relies on labels to indicate properties).

In some embodiments of the present disclosure, triggering predicates derive from a data element of the design/manufacturing documentation of the manufactured product; for example: data element specifications, labels, text, and/or images. Identification of trigger predicates from the design/manufacturing documentation may be manually assisted, for example, through the use of hand-operated computer input devices, speech-to-text facilities, user movement tracking, or another input method.

Trigger predicates are preferably inherent to the design/manufacturing documentation. However, they may optionally be inserted into the design/manufacturing documentation specifically for reasons relating to inspection requirements. Optionally, trigger predicates are identified with the use of conditioning inputs from outside the design/manufacturing files themselves. Optionally, inspection requirements selected automatically are subject to a process of further preparation-supplying parameters, for example, or their removal or deletion (automatically and/or manually).

Trigger Predicates and Semantic Information

Herein, the term semantic information is used to indicate information that enters into a process (performed by a computer processing system, for example) as part of denoting something.

For example, a particular element comprising a collection of vertices and edges in a 3-D drawing may be furthermore classified as a "screw" (e.g., by labeling using a text-encoded property, as exemplified by: type="screw"). Purely as a matter of syntax, this may increase the information of the drawing in certain formal ways—for example, by allowing the element to belong to selections and groupings of elements based on the text assigned to the property labeled type. But that label, as such, does not act to denote a screw in those respects. Another label used consistently within the drawing according to an expected syntax, would convey the same syntactical information.

However, the same label acting as a trigger predicate can also allow a computer processing system to associate specifically semantic information with the element. Additionally or alternatively, a property of the vertices and lines themselves (such as a helically formed outer surface) could be the trigger predicate allowing denoting the element as being as screw.

The semantic information which denotation brings may embody, for a processing system, "what it means to be a screw". At a more mechanical level, this meaning attaches consequences (optionally physical consequences, ultimately) that go beyond the triggering predicate itself. These consequences could be, for example, digitally encoded, and/or tied to screw-appropriate actions of a machine. Semantic information may also be referred to herein collectively as comprising a semantic group, particularly when it is semantically associated to an element via a common trigger predicate.

A fact distributed across a plurality of logically encoded elements (e.g., fitting some pattern) may also act as a trigger predicate, in some embodiments of the present disclosure. For example, an assembly element may be syntactically specified as comprising a sub-element of type axle with the relationship of being attached to each of two sub-elements of type wheel. This pattern may in turn be a trigger predicate which is processed to denote the semantic information that wheels attached to an axle are mounted to spin around their centers at opposite ends of the axle. In the context of an inspection system, a consequence may be performance of a test on the spinning functionality of the assembly element. Patterns comprising this sort of "distributed fact" are not restricted to sub-assemblies. For example, a trigger predicate may comprise facts like: separately assembled trim elements sharing a color, or a fastener exposed specifically on a functionally particular (e.g., inner, outer, upper, lower) surface of an item of manufacture.

Open/Semantic Specifications

In some embodiments, the process of semantic association is mediated through an intermediate element, referred to herein as a semantic specification. The semantic specification may be understood as making explicit a relationship "between" the trigger predicate and the semantic information it is taken to denote. As an example: a certain semantic specification may link the trigger predicate type="screw" (which might be defined as a text label of a certain bit of data in a design document) with the semantic information "comprises a slotted head and a threaded shaft". A different semantic specification may link the trigger predicate size="M4" with the same semantic information, and another different semantic specification may link the trigger predicate type="screw" to further semantic information such as "implies the existence of a matching threaded hole".

Additionally, a semantic specification is referred to herein as being "open" (as opposed to "closed"), in a domain-specific sense. Roughly put, the semantic specification is high level. Lower level primitives that its meaning depends on are left undescribed ("open"). This high level description can nevertheless be resolved to specifics ("closing" the semantic specification) when the semantic specification is interpreted by an appropriately capable downstream agent. "Open" and "closed" are relative to the primitives defined for a specific domain. For the domain of inspection requirements as related to herein, these primitives are more particularly described below.

As an example: recognition for some element of the trigger predicate type="screw" optionally leads to the creation (e.g., within the manufacturing documentation of a manufactured product) of the open semantic specification rotatable="true" on that element. This may in turn allow a later stage of processing to apply "rotating semantics" to the element; perhaps without having to re-recognize the rotatability of things of type screw in general, and instead by recognizing the semantic specification directly. Herein an automated module performing such a later-stage processing is also referred to as a "semantic agent", and in the case of processing for the purposes of quality inspection particularly, a "semantic inspection agent", or simply "inspection agent".

Relationship of Closed and Open (Semantic) Specifications

In the particular context of inspection requirements identification, a semantic specification specifies one or more inspection actions (e.g., by label and optionally parameters, starting from an original trigger predicate), while postponing the specification of details (the "primitives") of how the inspection actions are actually performed. Allowing this postponement is a feature of being "open". It a potential advantage for reducing the complexity of inspection requirement specification, since it avoids having to communicate about the details of low-level primitives.

In a contrasting case—for example for use within some manual or "low-level automated" quality inspection processes—inspection requirements are specified by a direct linkage of characteristics being inspected (properties of the manufactured product actually being measured), and the inspection actions which verify them (that is, perform the measurement, and optionally evaluate the measurement).

Such requirements are also referred to herein as "closed". Their characteristics and/or actions designate inspection "primitives", in a self-contained fashion, leaving little or no practical ambiguity. In particular, the primitives need not be explained or reduced further in order for them to be used in producing an inspection plan sufficiently detailed that its implementation assures the level of quality which the inspection requirements demand. In the context of visual inspection, primitive measurements include, but are not limited to, measurements of histograms, gradients, blob-analysis, morphology (e.g., distances and angles), and surface normals. Quality inspection using low-level automation resources (such as automatic metrology) benefits from the identification of closed inspection requirements because the detail provided reduces the scope for ambiguity in setup and validation by providing exactly what is to be measured.

In some embodiments of the present disclosure, inspection requirements selected and/or prepared on the basis of an identified trigger predicate are "open" and semantically specified (also referred to herein as "semantic inspection requirements"). To be fulfilled, a semantic inspection requirement is reduced (e.g., by an appropriate semantic inspection agent configured to process the semantic inspection requirement) to the primitives of characteristics and inspection actions. In effect, the semantic inspection requirement is closed by operations of the semantic inspection agent.

Closure may involve combining the semantic inspection requirement with other information in the manufacturing files, and/or with some representation and/or instantiation of domain knowledge that interprets the semantic inspection requirement. Again, reliance on later reduction to primitives (implicit or explicit) so that a useful inspection plan can be defined is what makes a semantic inspection requirement "open".

Not all "open" inspection requirements close down to explicitly identified primitives. For example, an open inspection requirement may specify verifying that a screw head is free of marks from tool damage. The method of verification implemented by a semantic inspection agent may comprise, e.g., application of a machine learning function which classifies the screw head as damaged or undamaged, and produces this classification as its sole output. There is still closure in this case, since the inspection requirement conveys little or nothing about the primitive geometrical characteristics to be evaluated, and since the machine learning function still goes on to produce a result dependent on features of those characteristics.

Optionally, after having received semantic inspection requirements determined as in some embodiments of the present disclosure, a downstream inspection planning system (e.g., a semantic inspection agent) eventually "closes" semantic inspection requirements. It does this by making a plan that identifies what and how to actually make measurements that test the requirement. Optionally, no actual list of "closed" inspection requirements is created; or if there is a list (e.g., for validation purposes), the list may be a byproduct of the inspection planning, rather than an input to inspection planning.

Open and closed inspection requirements in particular may additionally be compared in the types of information they specify:

A closed inspection requirement specifies a measurement action to be performed on a component characteristic, with the measurement result being compared to one or more specified values to judge if the requirement has been met.

An open inspection requirement specifies a quality concern to be evaluated (e.g., by a semantic inspection agent) for a component or components with certain denotation(s) (or "class(es)") and/or relationships.

Downstream inspection resources (e.g., inspection planning facilities and/or semantic inspection agents) are then responsible for matching concerns to measurements appropriate to the denotation and annotations of the component. In some embodiments of the present disclosure, annotations are provided along with the inspection requirement. The annotations, in some embodiments, comprise indications about the hierarchical availability of a requirement—for example that it must and/or should be fulfilled within the scope of a certain range of assembly levels. Inspection "too early", for example, might be unavailable because the inspected target is not yet created; inspection "too late" might be unavailable because the inspected target is at least partially obscured or otherwise difficult to access.

As an example illustrating the difference between open (or semantic) and closed (or low-level) inspection requirements: a semantic inspection requirement may be "make sure this connector is properly mounted". "Connector" is denoted, "properly mounted" is the concern. Cashing this requirement into more particular inspection actions is postponed until the operations of, e.g, a semantic inspection agent. The connector is optionally annotated by its subtype, for example a standard type like RJ45 or DIN-9; an extended part number, or another specification. Corresponding low-level inspection requirements, by contrast, would specify, for example, details of orientation angles, distances, soldering point sizes, and potentially more; each of these a characteristic with a particular associated measurement action, and range of allowed values. These characteristics and actions are made explicit before inspection resources can even be assigned, in contrast to the case using the semantic inspection agent, which is in itself a "smart" inspection resource.

The level of semantic specification can be more detailed than in the example (e.g., annotated with parameters such as tolerances that affect the meaning of "properly mounted"), but still be "open", in the sense that it relies on interpretation to be applied to an actual process of measurement.

Use of Semantic Inspection Requirements in Inspection Planning

Semantic inspection requirements have a potential disadvantage in the context of traditional (e.g., manually operated, and particularly in low-level automated) quality assurance, since they leave aspects of the requirement potentially ambiguous (open to interpretation). However, semantic inspection requirements are potentially advantageous in the context of automated quality inspection with a high level of predefined capability in inspection tasks.

In particular, a sophisticated inspection tool may embody sufficiently rich data representations of inspection targets (i.e., as one or more general classes/denotations of inspection targets) that it is capable of autonomously planning the fulfillment (and "closure") of semantic inspection requirements. For example, the tool can translate an open requirement amounting to "properly mounted" into tests and evaluations needed to close the requirement. The rich data representations inform, for example, as to which characteristics are relevant to inspection concerns; and how to interact with (e.g., image) the inspection target in order to measure those characteristics.

Additionally or alternatively, the rich data representation may comprise test capabilities which operate above the level of individual characteristics, to more global evaluations. For example, damage to a screw socket may be evaluated without particular reference to its individual surfaces (considered as characteristics), but rather to a pattern or abstractly specified feature of the collection of socket surfaces which a specialized machine learning product has been configured to recognize. Again, the open specification of the test requirement does not specify this feature, and perhaps no particular feature at all. Instead, the inspection tool "understands" what feature is relevant to the concern that the inspection requirement conveys.

Using an inspection tool with such capabilities, generating and communicating through closed inspection requirements may be seen as unnecessary and burdensome. Particularly for machine learning-implemented inspection capabilities, knowledge of how to specify a relevant closed inspection requirement may not even be available outside the automated inspection tool itself. In contrast, openness of a semantic inspection requirement potentially assists (e.g., simplifies) automation of inspection requirement identification itself.

In accordance with the framework of terminology defined above, there is provided, in some embodiments of the present disclosure, one or more methods of identifying trigger predicates for a manufactured product; and identifying, according to the identified trigger predicates, semantically grouped inspection requirements. The inspection requirements may be closed; and/or, in some preferred embodiments, open. Optionally, inspection requirements, once identified, are integrated with the design/manufacturing documentation.

Selecting Inspection Requirements Using the Assembly Tree Hierarchy

It may be understood that efforts to automate inspection requirement identification may give rise, in some embodiments, to a collection of approaches which respectively address different aspects of the task.

An aspect of some embodiments of the present disclosure relates to using relationship properties defined by a manufactured product's assembly tree and/or product tree as trigger predicates to assist identification (i.e., selection and/or preparation) of inspection requirements for the manufactured product.

In some embodiments, the relationship properties are based in the design hierarchy, and/or in geometrical relationships among assembled components of the design. Some relationship properties are of another or an additional type—for example, groupings of individual components which are based on properties (e.g., color, style, part family, or another property) which span different branches of the design hierarchy, and have no particular relationship to geometry or assembly as such.

As the terms are used herein, both assembly trees and product trees are hierarchically organized lists which may be specified as part of a manufactured product's design documentation. The leaves (lowest-level elements) of the hierarchy are components corresponding to parts which go into the tree, while higher-level nodes are groups of components, up to the final group which is the manufactured product itself. The two trees differ in use. The product tree is a hierarchical structure which reflects the CAD hierarchy, while the assembly tree is a hierarchical structure which reflects the order of manufacturing. The two may use a same hierarchical structure, but not necessarily. For example, the CAD hierarchy may group components based on properties such as similarity of property or function; while the assembly tree may group components based on when they attach to one another during the assembly process (such that nodes correspond to physical assemblies). Herein, the term "design hierarchy" includes either or both of the hierarchies of the assembly tree and product tree.

The identified inspection requirements are optionally open (semantic) or closed. Optionally, the identified inspection requirements are provided to an automatic inspection planning system configured to generate an inspection plan, the actions of which said plan fulfill the inspection requirements.

In accordance with this aspect of the present disclosure, some component relationships within a manufactured item may have a particular relevance as trigger predicates for inspection requirements.

In some embodiments of the present disclosure, a manufactured product's design hierarchy is used as a guide to selecting quality inspection requirements. The design hierarchy is analyzed for the presence of some property or properties. Analysis output is used in turn as a trigger predicate, based upon which inspection requirements appropriate to the assembly are assigned to it. In some embodiments, the analysis output comprises a classification of the assembly.

In some embodiments, at least some assemblies within a manufactured product comprise units of broadly standard types, and/or having broadly standard features. Sub-assembly types tend to be recurring within a particular manufacturing domain (e.g., a particular industry). For example, an assembly of an electronics product may be a keyboard, a connector group, a circuit board, or a case (to give a few examples). Assemblies for furniture products may include such items as frames, drawers, rails, upholstery sections, and spring units. Vehicular manufacturing has an enormous number of assembly types—for example, chassis, body, engine, transmission, door, and instrument display. Each of these in turn is composed of numerous sub-assemblies of its own.

Within design and manufacturing documents, assemblies are optionally (although typically) labeled according to type. The range of valid labels may be, for example: closely controlled (e.g., to a predefined list of options), or more free-form (e.g., a descriptive phrase entered by the designer). Other textual information may be used that explicitly provides type identification, for example, keywords associated with the assembly. Labels and keywords, in whole or in part, may in turn become the basis of assembly classification. In further turn, the assembly classification becomes a trigger predicate for association of inspection requirements to the assembly. It is noted that these kinds of assembly classifications correspond largely to the "label-like" aspect of trigger predicates described hereinabove.

Additionally or alternatively, assembly type may be identified, at least in part, from assembly features such as assembly class designations, and/or geometric relationships of components. Type identity may be straightforwardly conferred by component identifiers: for example, an assembly comprising a plurality of connector components may, on that basis, be classified as a connector group. An assembly comprising a plurality of key caps may be classified as a keyboard. Additionally or alternatively, geometry may be used to help determine assembly designations based on spatial clustering of components, spatial contiguity of components, or another geometrical criterion. Component-based identification is optionally confined to a particular assembly level incorporating the component; e.g., optionally the first or second assembly level to incorporate it; since assemblies in turn become sub-assemblies of other assemblies, up to the level of the assembly corresponding to the completed manufactured product.

Component-based type assembly identification may rely on more than one component type. For example, a first assembly level comprising both an axle and two wheels may be designated a wheeled axle assembly. Additionally or alternatively, an assembly type designation may be based on non-component features acquired during manufacturing. For example, a sheet metal part may only become a case panel (as far as inspection requirements are concerned) after a stage of forming, cutting, and/or finishing.

Optionally, assembly type is first identified on the basis of such features and when they are acquired along the assembly tree of a manufactured product; and then this type treated as the trigger predicate for association to inspection requirements. It should be understood however, that the features themselves are optionally sufficient trigger predicates.

It should be understood that there is no particular restriction of assemblies to being of a single type. Classification of an assembly optionally relies on any number of type identifications and/or features. This can effectively group them into a single, albeit optionally compositely-defined trigger predicate. Additionally or alternatively, a trigger predicate can be defined more simply (e.g., as a major assembly classification such as keyboard), and features and/or type identifications of a particular keyboard applied as annotations to refine what is denoted by keyboard, enabling the identification of a more specific inspection requirement.

An assembly may also have a plurality of classifications that apply to it (with association to a corresponding plurality of inspection requirement groups triggered thereby). For example, an assembly denoted as a keyboard may also be denoted as an indicator board (e.g., because it carries LEDs that light up according to state and/or key presses). Descriptions provided herein focus on single-stream analysis/classification/inspection requirement examples, but it should be understood that multiple stream embodiments also fall within the scope of the present descriptions.

Before explaining at least one embodiment of the present disclosure in detail, it is to be understood that the present disclosure is not necessarily limited in its application to the details of construction and the arrangement of the components and/or methods set forth in the following description and/or illustrated in the drawings. Features described in the current disclosure, including features of the invention, are capable of other embodiments or of being practiced or carried out in various ways.

Methods of Identifying Inspection Requirements

Reference is now made to FIG. 1A, which schematically illustrates a method of automatically identifying inspection requirements, according to some embodiments of the present disclosure. Optionally, the identified inspection requirements are linked (e.g., by document-level insertion of and/or referencing to data elements) into design and/or production processes (including one or both of manufacturing and/or inspection).

At block 110, in some embodiments, the component relationships of the product (e.g., hierarchical relationships, for example as discussed in relation to FIG. 2A) are analyzed to determine the presence of a trigger predicate. Optionally, the trigger predicate has an aspect which is revealed by the hierarchical nature of the design hierarchy—for example, it relies on a property which is created by assembly (at a particular stage of the assembly tree). In another example, the trigger predicate might be a geometrical relationship. For example, two parts having edges which extend along each other with nothing between them except a non-zero distance geometrically define a "gap". Gaps which are significant as trigger predicates might furthermore be limited to occur between components with particular designations; for example, key caps or enclosure components.

At block 112, in some embodiments, a semantic group of inspection requirements is selected (e.g., from an inspection requirements library 124; FIG. 1B), based on the trigger predicate. In some embodiments, one or more of the inspection requirements has an aspect which is affected by the design hierarchy. For example, a target of the inspection requirement only exists at or after a certain stage of assembly; or the target is unavailable for inspection (e.g., hidden)

at or after a certain stage of assembly. In some embodiments, the aspect relates to optimization of an inspection plan—for example, there may be cost tradeoffs to inspection of the target at different stages of assembly.

Optionally, at block 114, in some embodiments, the inspection requirements are prepared. This optionally comprises collection of parameters, e.g., from design documentation (including geometry and/or inter-component relationships) and/or user input. The collected parameters are used to add specifying information to the inspection requirements as may be appropriate to particular requirements.

Optionally, the semantic group of inspection requirements itself comprises semantic (open) specifications of inspection requirements. Because semantic specifications are interpreted by processes comprising a high level of predefined "expertise", these semantic specifications might already be complete as far as the needs of other processes (e.g., inspection planning) is concerned.

Accordingly, the semantic specifications optionally receive no significant preparation within block 114. Alternatively, there may be value in preparing any particular inspection requirement further, e.g., by providing annotations which give information beyond what the denotation signifies. Those annotations may derive, for example, from product documents, factory conditions, and/or manual inputs. Preparation at block 114 may also be used to delete inspection requirements, or to add inspection requirements (e.g., to manually add inspection requirements that automatic selection did not identify). An annotation type of particular interest for some embodiments of the present disclosure is annotation to designate effects of the design hierarchy on inspection requirements—for example, when (during assembly) inspection is optimal, preferred, possible, and/or impossible.

In some embodiments, at least some "closed" inspection requirements are to be provided. Although closed, they are still a members of a "semantic group" of inspection requirements, insofar as they are denoted by the trigger predicate as described in relation to block 112.

Provision of closed inspection requirements is optionally done at this stage by defining at least some inspection requirements in their library as templates of closed inspection requirements. Then the processing to prepare them at block 114 fills in the template appropriately. For example, a certain part number mentioned as a component in the assembly tree may be a trigger predicate for a group of closed inspection requirements that is prepared (e.g., with expected and tolerance values) according to metadata associated with the part number in a parts database.

Providing closed inspection requirements may be useful in a mixed inspection environment comprising highly automated inspection resources and low-level inspection resources (e.g., fixed metrology devices). Additionally or alternatively, inspection requirements may be "open" upon completion of selection and optional preparation (at block 114); and instead, transformed to "closed" status during a later stage in inspection planning. In the later stage, open inspection requirements governing inspection tasks allocated to low-level inspection resources may be respecified in terms of one or more closed inspection requirements.

Optionally, at block 116, the identified inspection requirements are linked into design and/or production processes. Linkage typically comprises document-level definition of new data elements that specify the inspection requirements. Linkage furthermore comprises some form of referencing between the new data elements and existing data elements in the design/production documentation. For example, assuming the inspection requirements are processed to an XML-encoded elements, the XML elements may be inserted to where their context makes it clear what components/assemblies they modify. Alternatively, the XML elements make up a separate section which links to particular components/assemblies according to identifying field values. The linkage to any particular existing document is optionally in either direction, including two-way; linkage to documents is optionally multi-way among multiple documents.

Linkage into design processes points "backward" (potentially influencing the design process itself, e.g., in revision), while linkage into production processes such as manufacturing and inspection points "forward" (e.g., by specifying inspection requirements for use by inspection agents). A single linkage (e.g., snippet of XML) may simultaneously link into processes both forward and backward. Whether forwards- or backwards-pointing (or both), linkages can be used to trigger re-examinations anywhere along the design/production chain whenever any element in the chain changes. The linkages may be specified, for example, using an XML schema. An example of inspection requirements annotations specified according to one such optional XML schema is provided hereinbelow.

In the "backwards-pointing" sense, inspection requirements make explicit what may have been implicit (or largely implicit) in the original design—and/or, contrariwise, highlight what the original design left ambiguous. By incorporating the inspection requirements into design documents explicitly, the design itself (i.e., future revisions of the design) may be affected. For example, the linkage makes it explicit to someone reviewing the design what inspection costs may be associated with a particular component of the manufactured product. This could motivate design alterations to reduce those costs, for example. Potentially, linkage of inspection requirements into design documentation highlights opportunities for design changes that would obsolete, combine, or otherwise streamline inspection processes.

More particularly, in some embodiments, this may affect hierarchy of the assembly tree. A design reviewer can see at what stages a certain component is inspectable, potentially leading to an understanding that a design change could affect this range of stages in a way that allows realizing potential improvements in production processes and/or overall quality. For example, if there is a single hidden screw currently necessitating a special inspection station set up at an early stage, the design could be modified to provide a window onto that screw which allows it to be inspected at another inspection station, later on.

In the "forwards-pointing" sense, inspection requirements represent primary material for inspection planning. Moreover, and particularly in coordination with inspection planning, inspection requirements can affect how manufacturing is performed. For example, inspection tasks may be interspersed with manufacturing tasks along an assembly line; this in turn may affect tooling, how tasks are distributed among assembly stations, or another aspect of manufacturing. Insofar as inspection requirements incorporate information about when an inspection requirement can be fulfilled (e.g., at what stage of hierarchical assembly), they potentially also increase flexibility in production planning and/or expose opportunities for gains in production efficiency.

Systems for Identifying Inspection Requirements

Reference is now made to FIG. 1B, which schematically illustrates a system for automatic identification of inspection requirements based on a design hierarchy 120 for a manufactured product, according to some embodiments of the present disclosure.

System Modules and Inputs

In overview, trigger predicate analyzer 126 receives information from design hierarchy 120 and trigger predicate library 122 (however constructed), and outputs the trigger predicates discovered in design hierarchy 120, corresponding to block 110 of FIG. 1A. Inspection requirement preparer 128 receives the trigger predicates, applies them to make selections from inspection requirements library 124, and optionally performs other preparatory work on the selected inspection requirements; corresponding to operations of blocks 112 and 114 of FIG. 1A. The prepared inspection requirements can then be distributed: for example, integrated into design documents 131, provided for inspection planning 135 (optionally, "to inspection planning" represents providing "to a semantic inspection agent"), and/or provided as an input to manufacturing planning 133.

In a general sense, inspection requirements library 124 can be viewed as a dictionary that associates groups of one or more inspection requirements to respective trigger predicates. Inspection requirements (belonging to inspection requirements library 124) are defined and discussed herein as part of the overview, with additional examples provided together with descriptions of, e.g., FIGS. 2A, 3, and 4.

Trigger predicates (belonging to optional trigger predicate library 122) are defined and discussed herein as part of the overview, with additional examples provided together with descriptions of, e.g., FIGS. 2A, 3, and 4. They can be detected within the design hierarchy 120 (e.g., by trigger predicate analyzer 126) on the basis of, for example, component content (e.g., FIG. 2C) and/or textual content (FIG. 2B). Component content relates to any design hierarchy 120 or conditioning input 121 content that identifies and/or characterizes components. It may be determined based on, for example, geometry, textual content, image content, or any combination thereof.

Textual content might also be component content, but the concept also extends to any other textual annotation of the design hierarchy 120 and conditioning input 121. In particular, keywords, instructions, and comments may be indicative of inspection policies, quality policies, and/or of the manufacturing context more generally, regardless of association with particular components or design features.

It should be understood, moreover, that trigger predicate identification is not limited to the use of "component content" and "text content". For example, operator indications by speech or gesture could be used to identify trigger predicates, as, could any of the conditioning inputs 121 further discussed hereinbelow.

Inspection requirement preparer 128 optionally supplies parameters to selected inspection requirements; for example extracting types, tolerances, baselines, or other needed data. In some embodiments, the later processes themselves perform such extraction, e.g., by also using access to the data of design hierarchy 120.

There may optionally be provided conditioning inputs 121, 123 to respectively adjust trigger predicate analysis at block 126, and/or inspection requirement preparation at block 128. There may also be (for example, as described below) "crosstalk" between the inspection requirements library 124 and the trigger predicate library 124; and/or between discovered trigger predicates and inspection requirements library 124.

Additional Interactions Among System Modules and Inputs

Optional interactions between these functional blocks, their inputs, and their operations, are further described as follows.

Primary inputs to the trigger predicate analyzer 126 comprise the design hierarchy 120 itself, and an inspection requirements library 124.

Optionally, there is provided a separate trigger predicate library 122. This can provide decoupling between the inspection requirements library and the design hierarchy. For example, the inspection requirements library 124 can specify for a group of requirements that they apply to a trigger predicate named screw, while the trigger predicate library can link the name screw more particularly to specifications that define screw elements in the design hierarchy 120. The trigger predicate library 122 may also comprise specification of how to access information outside the design hierarchy (user prompts and/or procedure documents, for example) that might affect the identification of a trigger predicate. This outside information could be provided as conditioning inputs 121, for example.

A link drawn from the inspection requirements library 124 is shown terminating with a circle surrounding another link drawn between trigger predicate library 122 and trigger predicate analyzer 126. This is to indicate that information in the inspection requirements library 124 optionally is used to modify the trigger predicate library 122. For example, the trigger predicate library 122 may be filtered to remove entries that are irrelevant to any of the available groups of inspection requirements. Additionally or alternatively, the link indicates use of the inspection requirements library 124 itself to provide at least part of the content of trigger predicate library 122. For example, the inspection requirements library 124 may define PATH selectors that are not only useful for dictionary lookup, but also fully specify at least some trigger predicates within the context of XML used to construct the design hierarchy.

Optionally, the input from design hierarchy 120 is supplemented with conditioning inputs 121. These conditioning inputs 121 may comprise manual and/or auxiliary inputs that guide trigger predicate analysis—inputs that for whatever reason are not in the design hierarchy itself (even if they optionally could be).

An auxiliary input may add predicate detection information to the design hierarchy. For example, a relationship between assemblies defined within the design hierarchy which are related, but not necessarily in a way that the design hierarchy itself highlights.

An example of such a relationship is assemblies next to each other—but not otherwise clearly related by annotations in the assembly tree—whose relative positioning may nevertheless be a matter for inspection.

In another example, there may be alternate sets of parts used as components (e.g., trim pieces which should be used in matched sets), and the conditioning inputs could specify this linking information. Such information might preferably be pre-specified within the assembly tree itself. However there might, for example, be a supply issue wherein two batches of the same part number are imperfectly matched, resulting in an on-the-fly production issue which can be resolved by adapting procedures including via inspection requirements.

In yet another example, there may be intermediate stages of manufacture wherein a jig, clamp, scaffold, tape, or other extrinsic piece is temporarily attached to a manufactured product. Presence of such a piece may be subject to inspection (e.g., as if it were another assembly), or may affect whether some other component is sufficiently exposed to allow inspection. Documentation of this might not be present in the design documentation of the assembly tree. Such information is optionally provided through manufacturing documents provided as part of conditioning inputs 121, or by another method, for example, manual adjustment.

Additionally or alternatively, conditioning inputs 121 may directly or indirectly reflect factory conditions—for example, adjustments to conditions such as part inventory, part sources (suppliers), tooling state, tooling availability, state of worker training, and/or labor allocation (e.g., for shifts with more or fewer workers). These conditions could affect the interpretation of predicates, for example, by changing assembly order. For example, labor to perform a skilled assembly task may be available only on the day shift, creating shift-dependent differences in the trigger predicates affecting inspection planning. Conditioning inputs could be used to mask certain components or assemblies from analysis.

Additionally or alternatively, conditioning inputs 121 may be used to assist trigger predicate detection itself. For example, a certain trigger predicate may lack an automatic detection method, perhaps by being based on a combination of conditions heretofore unforeseen. An automatic detection method which does exist may be prone to false positives or false negatives, which manually provided conditioning input can help avoid and/or resolve. A semi-automatic detection method may be designed operate in conducting with operator assistance, assisting but not fully able to perform trigger predicate identification. In another example, trigger predicate detection may be correct, but a human operator may simply know that there is no need to generate corresponding inspection requirements (for example, there is a reason that the trigger predicate is irrelevant, or that the inspection requirements triggers are inherently met by other inspection requirements).

Conditioning inputs 121 might apply additionally or alternatively to a version of the assembly tree provided to inspection requirement preparer 128. Furthermore, not all of the optional application points of conditioning inputs 121 are shown in FIG. 1B; for example, there may also be conditioning inputs which effectively apply to intermediate results and/or output of trigger predicate analyzer 126 and/or inspection requirement preparer 128.

Conditioning inputs 123 optionally correspond to any of the inputs described in relation to conditioning inputs 121, though typically omitting those which are specifically driven by design details in assembly tree 120. Design detail-driven modification is part of the job of inspection requirement preparer 128 which itself has access to assembly tree 120 and associated conditioning inputs 121. Conditioning inputs 123 may be particularly derived from inspection and/or quality policy documents, which shape which inspection requirements from inspection library 124 are considered most relevant for a production facility's particular products, clients, and/or production processes.

Reference is now made to FIG. 1C, which schematically compares open and closed inspection requirement specifications, according to some embodiments of the present disclosure. A typical process flow, in some embodiments of the present disclosure, connects trigger predicates 140 with the formulation and execution of inspection plans 143 via inspection requirements.

Distinctions between "open" and "closed" inspection requirements are described in the Overview.

Briefly, a closed inspection requirement specification 142 sets for requirements in "low-level" terms that associate measurable characteristics with appropriate measurement actions. Values may be given that allow the measurement outcome to be evaluated for meeting the particular requirement. Sometimes the measurement action itself is unspecified, with the measurable characteristic itself leaving little ambiguity as to "what counts" as fulfilling the requirement. At the conclusion of an inspection plan, the output (i.e., in the successful case) is equivalent to a judgement such as shown in block 145: "The characteristic measures within allowed values." This maps back directly to the terms of the closed inspection requirement.

Typically a trigger predicate for a closed inspection requirement will be narrowly defined, as closed inspection requirements tend to be less flexible in generation and application.

An open inspection requirement specification 141 is defined to be about what the trigger predicate is understood to denote (the denotation). This could be a component or assembly; and generally will not relate to particular characteristics of a component or assembly.

Instead of specifying particular actions, an open inspection requirement specification will more typically relate to "concerns". Concerns indicate high level issues like:

Presence of a component.

A surface meets a cosmetic specification.

Uniform appearance of components with matched specifications.

A component satisfies a suite of class-specific quality issues. For example (classes in emphasis):

A case is closed and properly attached along its seams.

A screw is tight and without a stripped head.

A molded component is entire (e.g, matches its design model shape) with no protruding flash.

A connector is straight and aligned with its context.

A label is squarely placed and readable.

A snap assembly has its snapped together parts positioned correctly relative to each other.

A pattern (of components) matches its template definition.

Sometimes the trigger predicate alone implies a concern (e.g., a component of screw also elicits screw concerns), but the relationship is not always necessary (e.g. a screw could be provided as a loose kit component), and is typically not one-to one (e.g., "presence" is not necessarily part of the suite of tests implied by screw concerns).

The inspection requirement specification optionally includes annotations that further define its scope or application. Typical annotations are sub-classifications within the class that the trigger predicate denotes. A screw for example, may be annotated as an M3 screw, and/or a Phillips head screw. The annotation is optionally directly indicated as a property, e.g., in the model-based definition (MBD) of the product, or indirectly. The MBD comprises a design model for the product: for example, a 3-D geometrical model of the product, with other information as may be appropriate for defining the product and/or its manufacturing processes, for example, tolerances, component level materials, assembly level bills of materials, engineering configurations and/or design intent. In some embodiments, the MBD includes an assembly tree, which organizes components of the product into a hierarchy of assemblies and sub-assemblies.

As an example of indirect indication, shorthand designations of parts (e.g., by part number) are optionally interpretable as indicating features of the part. For example, the part number may comprise a plurality of concatenated fields (optionally delimited by a dash or other character). For parts of certain classes, the value of each field may further specify sub-classes. Screws, for example, comprise a number of features which may be composed in different combinations: material, thread pitch, shaft diameter, shaft length, head style, and slot/socket style, for example.

Accordingly, in some embodiments, design document designations of parts can be interpreted through part numbering conventions to learn more about the part itself.

Annotations can modify inspection requirements in other ways too; for example, based on the hierarchical structure of the manufactured product as indicated by its model based definitions (MBD)-designated assembly tree. From the assembly tree (e.g., its hierarchical structure and/or the geometry of assemblies derived from a combination of the assembly tree with other MBD data), it can be determined when a component and/or assembly is available to inspect—e.g., both present (assembled) and visible (not obscured by a later stage of assembly).

The annotations could come from information in the design documentation, optionally supplemented by a "smart" part numbering scheme. Thus, annotations are optionally omitted from the inspection requirements themselves, with the job of extracting the information being postponed until at least inspection planning—assuming the inspection planner itself has access to the design documentation.

However, extracting annotation information into the requirements creates a point of focus. Annotation information can be pulled into the requirements from any of several sources (design model, quality policy, manual additions, and/or images, for example) into a standard representation that inspection planning can reference directly without itself needing access to the more indirect sources of information. It should be noted that annotations may themselves be inserted as references rather than as direct values. For example, a quality policy-defined designation may be specified by reference (e.g., "surface quality class B").

At the conclusion of an inspection plan, the output (i.e., in the successful case) is equivalent to a judgement such as shown in block 144: "Concerns for the denoted and annotated type are satisfied." It is relevant to note that the enumeration of characteristic measurements raised by these "concerns" is under the control of the inspection plan 143 in the case of an open inspection requirement specification, while a closed inspection requirement specification begins with an enumerated list of characteristic measurements.

Reference is now made to FIG. 2A, which schematically illustrates aspects of model-based design documents, according to some embodiments of the present disclosure.

Model-based enterprise (MBE) is a term used in manufacturing, to describe a strategy where an annotated digital three-dimensional (3-D) model of a product serves as the authoritative information source for all activities in that product's lifecycle. Encoded information specifies, for example: geometry, topology, dimensions, tolerances, materials, finishes, and weld call-outs. Assembly tree and/or product tree information may also be specified. Together, these comprise the model based definitions (MBD) of the product. They may be represented in one of several standard MBD-compatible formats, for example: f3D PDF, JT, STEP AP 242, and/or ANSI QIF. MBD documentation is suitable for use in downstream activities of the product Lifecycle, including in manufacturing and quality inspection.

A manufactured product comprises an assembly of components. The components may be themselves assemblies (of sub-components), or parts which enter directly to the assembly process. Correspondingly, a typical aspect of a product's MBD is a hierarchical organization of its components which specifies parts (that become components), and then an ordering of how components come together to form a hierarchy of assembly combinations, up to the level of the finished product (which may itself be considered the final assembly). The assembly tree not only is an assistance to design, but it is also preferably a guide to the planning of manufacture. In some embodiments of the present disclosure, the assembly tree is also used as a guide to the identification of inspection requirements.

FIG. 2A illustrates the assembly tree of a simple manufactured product which is a toy car (plaything). There are three parts (octagonal boxes) comprising wheel 322, axle 324, and body 310. In the assembly tree model, these receive respective identifiers a1, p2, and p3. The designation of an item as a "part" is separate from a particular use of that part as a component of a manufactured product. However, the same physical items which are represented in the assembly tree as "parts" may be further designated as "components" (rectangular boxes) insofar as they are used in assembling a product.

Component designations differentiate from physically identical parts by being destined for different (particular) positions in the manufactured products. The components which are simply component-identified parts include body 304, axle 314, left wheel 316, and right wheel 318 (with respective identifiers c1, c4, c5, and c6).

An assembly (round-cornered rectangles) comprises a plurality of attached components. The final manufactured product is car 302, which is also an assembly with the identifier a1. Another assembly is axle-with-wheels 312, identified as a2.

Physical items represented as assemblies may also be represented as components. For example, assembly 312 is also a component: front axle with wheels 306, and rear axle with wheels 308 (identified as c2 and c3, respectively). Each part is furthermore associated with 3-D design information giving its shape; assemblies are associated with 3-D design information giving relative positions of components. The 3-D design information might be maintained as a master document that can be referenced (e.g., from the assembly tree) to indicate portions corresponding to parts and assemblies.

Referring to the system of FIG. 1B, FIG. 2A corresponds to assembly tree 120. The trigger predicate library 122 may specify trigger predicates which identify any of the parts, components, or assemblies of FIG. 2A, for example, (e.g., by the operation of trigger predicate analyzer 126) according to one of the methods of FIGS. 2B-2C, or another method. Inspection requirement library 124 optionally includes inspection requirements particular to any of the identified elements in FIG. 2A.

Optionally, the toy car of FIG. 2A is produced in a factory which produces many products, for example, a number of variant toy vehicles, some of which might have different and/or additional parts. For example, the factory might assemble products using wheels, bodies, and/or axles with different identifiers; there may be parts or assemblies having different types altogether. The products may have shared properties (e.g., many of them also comprise a body and two axles with wheels), but may also be different in some or all of their parts and components. The toy car of FIG. 2A may furthermore be produced in a plurality of variants—for example, different colors or markings, or auxiliary parts. Optionally, tooling and other resources (stations, and the factory workers themselves, for example) are shared among several products. Conversely, the same product is optionally be produced by alternate methods—for example, with or without a jig that helps align axles 314 with holding snaps in the body 304.

These optional factory conditions are mentioned as background for several examples relating to the automatic identification of inspection requirements. In particular:

There could be, e.g., many different versions of axle-with-wheels assemblies, which all need the same kinds of testing, but for which the test specifics depend on overall design. For example, the assembly-level characteristic of inside wheel distance might be different in different products, but need inspection in all of them. This illustrates a potential advantage for inspection requirement library 124 to specify requirements semantically, and according to the hierarchical structure of an assembly tree and/or product tree.

It might be preferable to inspect assemblies differently, depending on details of the product geometry. For example, axles might need to be inspected for straightness. Some products may place a bottom on the car that hides the axle, while the one of FIG. 2A does not—resulting in a different last-possible inspection stage for this characteristic, identified, in some embodiments, by inspection of the 3-D design data, e.g., at each stage of assembly, to identify what the visible stage(s) of assembly actually are.

It may be preferable to identify flaws in a product with more expensive components and/or assembly costs earlier (e.g., to reduce waste). Keeping a lower cost of inspection (e.g., by concentrating inspection to a single final workstation) may be preferable for another product. Accordingly, identifying the assembly stages at which a characteristic can be inspected potentially provides an input which can assist the optimization of inspection planning.

It might be preferable to inspect assemblies differently, depending on details of the manufacturing process. For example, an automated assembly step may rely on receiving known-good components to avoid jamming the system, while the corresponding manual step is unaffected. In another example, it may be determined that a bent axle is a potential result of rapid, but not slower operation of an assembling machine; while either speed of operation may be alternately preferable otherwise, depending on external factors. In both of these scenarios, earlier or later inspection may be preferred, depending on which type of production is being performed. Again, it is a potential advantage to identify the range of possible stages of inspection, so that inspection planning can select the stage which is preferred for current production conditions.

Reference is now made to FIG. 2B, which schematically illustrates a method of identifying a component-based trigger predicate within a design hierarchy, according to some embodiments of the present disclosure.

Hierarchy node 230 comprises a specification (e.g., a data structure, for example an XML-specified data structure) of a particular assembly or other node of a design hierarchy 120. Trigger parameter specification 232 comprises, for example, a specification from a trigger predicate library 122.

The goal of the procedure (implemented, for example, by trigger predicate analyzer 126 of FIG. 1B) is to test whether or not the hierarchy node 230 encodes a suitable trigger predicate as defined by the trigger parameter specification 232. In this particular method, the trigger parameter specification 232 is of a particular type: it specifies both the presence of certain components, and a certain "exposure" of the assembly to inspection. This exposure could be specified in different ways, as described in relation to block 212.

At block 210, in some embodiments, the assembly specification is queried for whether it defines ("has") one or more components mentioned in the trigger parameter specifications 232. In a simple case, this comprises one or more data lookups (e.g., like an XPATH query), wherein trigger parameter specification 232 specifies a query string tailored to find components with a particular property, part number, partial part number, keyword, or other string from within the (optionally XML-specified) hierarchy node 230. However, there is no particular limitation to the use of text data for the lookup; for example, particular features of geometry could be specified in trigger parameter specification 232. The query could also include other logical relationships among components, for example, negative queries (does not include a certain part) queries in the inclusive alternative (includes at least one of a plurality of certain parts), and/or queries in the exclusive alternative (includes no more than one of a plurality of certain parts).

If the component test fails, the flowchart ends at block 223: the hierarchy node 230 does not define characteristics comprising a trigger predicate for the given trigger parameter specification 232.

Otherwise, the flowchart continues at block 212, in some embodiments, to validate the assembly level. While different tests and test combinations are possible, here are two representative tests:

In a simple case, the test is simply to verify that the assembly is the first level at which the component tests of block 210 are fulfilled.

Additionally or alternatively, a test verifies that certain surfaces, components, or other features are visible, e.g., from outside the assembly (while "looking at it from a distance"). The surface, components, or other features may be selected as appropriate for the features of interest on the component. Since a 3-D model of the manufactured product is available, this determination can be made using algorithms similar to those already used in 3-D rendering display, e.g., by drawing rays in a rendered space from the assembly to different directions, and testing for intersections.

The test could optionally be of a different criterion, e.g., accessibility of electrical test points to a probe, optionally based on simulated movements of a probe shaped object in the vicinity of the assembly.

If the level test(s) also give a positive result, then at block 221, the production of a trigger predicate is signaled. Otherwise, "not trigger predicate" is signaled, at block 223.

There may be more than one level of assembly that gives a trigger predicate result—that is, the trigger parameter specification is optionally designed to allow trigger predicates to be produced at more than one level of assembly. In some embodiments, this results in a test requirement that is annotated to allow inspection at any valid stage of assembly, e.g., according to other inspection planning considerations.

Reference is now made to FIG. 2C, which schematically illustrates a method of identifying a text-based trigger predicate within a design hierarchy, according to some embodiments of the present disclosure.

As described for FIG. 2B, hierarchy node 230 comprises a specification of a particular assembly selected from a design hierarchy 120. Trigger parameter specification 232 comprises, for example, a specification from a trigger predicate library 122.

The goal of the procedure (implemented, for example, by trigger predicate analyzer 126 of FIG. 1B) is to test whether or not the hierarchy node 230 encodes a suitable trigger predicate as defined by the trigger parameter specification 232. In this particular method, the trigger parameter specification 232 is based on generic text fields. While it might be based on part/component names (e.g., as specified for FIG. 2A), it might additionally or alternatively be based on any other text in the assembly specification: label, element name, keyword, comment, or otherwise. In particular, the hierarchy node 230 may include labeling or keywords applicable to the assembly itself. Thus, instead of being identified based on component content (as in FIG. 2B), the assembly may simply have been labeled as belong to a certain class (e.g.: keyboard) or with commenting/keywords otherwise of relevance to inspection processes (e.g.: all connectors flush, all parts same color, or deburr after assembly).

At block 234, text fields are analyzed for content matching specification of the trigger parameter specification. Comments/keywords may be identified based on strict string matching, or on a natural language facility, e.g., based on machine learning trained on relevant examples. Optionally, formally specified searches (e.g., XPATH-type searching) are supported to identify text-encoded elements and/or properties of the hierarchy node 230.

At block 236, it is determined whether or not a match to the trigger parameter specification has been found. If so, then at block 237, the production of a trigger predicate is signaled. Otherwise, "not trigger predicate" is signaled at block 239.

Keyboard Example

Reference is now made to FIG. 3, which schematically represents an image 500 of an inspected portion of a keyboard 500A, according to some embodiments of the present disclosure. Image 500 represents an image obtained by an automated visual inspection system.

The example of a keyboard provides an example which illustrates several different aspects of physical positioning relationships within a hierarchically defined assembly. Physical positioning relationships which are particularly salient targets for inspection may include, for example, boundaries along which two components are in contact and/or close proximity. Such boundaries can be salient because, for example:

They are particularly visible, with potential aesthetic impact if misaligned.

They are indicative—for example, of quality of fastening. Irregularities may indicate, for example, incomplete snap closure or a loose screw.

They have functional impact on product performance. For example, electrical contacts may be missed, and/or stresses may be increased.

The alignment of keycaps 501 on a keyboard may impact on any or all of these considerations, e.g., misaligned keys look wrong, are likely to be improperly installed, and potentially fail to work correctly.

The keyboard can be used as an example of the implementation of the flowcharts and systems of FIGS. 1A-1B and 2B-2C.

Beginning with block 110 of FIG. 1A, the trigger predicate of a keyboard could simply be (e.g., based on the method of FIG. 2C) that it is labeled at an appropriate place in its design specifications as a keyboard. Additionally, or alternatively, the presence of keycaps 501 or other "keyboard-specific" components like key harnesses could be used (e.g., based on the method of FIG. 2B) to generate a trigger predicate indicating that a group of "keyboard" inspection requirements is to be used.

Keyboard assemblies are an example of an assembly class which is both common, and subject to many different actual implementations. In detail, their dimensions and other characteristics (e.g., key arrangements) are noticeably variable. However, they also share sufficient commonalities that a tailored set of inspection requirements tailored to a keyboard are potentially of value, e.g., to a factory that assembles keyboard of various models.

An inspection requirements library 124 may optionally comprise a group of inspection requirements which are triggered by a keyboard trigger predicate of one type or another. Being tailored to the requirement of a keyboard, the group optionally comprises requirements to inspect for one or more of (for example):

Defective printing on the keycaps 501

Disordered keycaps 501

Missing keycaps 501

Present but badly aligned keycaps 501

Particularly in a case where semantically specified test requirements are accepted in downstream inspection planning processes, an operator potentially would have to specify little if anything further, at least at the requirements stage. For example, there would be, in some embodiments, a downstream inspection agent (computerized module) of a "smart" inspection system that is preconfigured to fulfill each of the first three requirements by a method comprising:

Find and take an image of the keyboard of a "golden part" (to which it is exposed as part of inspection setup) for which a keyboard inspections requirement exists.

Identify the keys in that image and their locations.

Use the layout of keys in that image as a template for key identification.

Use the printing on keys in that image as a reference against which later keyboard will be tested.

This identifies defective printing directly, and missing/disordered keycaps 501 as a byproduct. Recognizing the synergy of these three tests would effectively be enshrined into the quality system, highlighting some of the value of a semantic inspection requirements system.

Supposing for the sake of illustration that the apparent mutual inherency of test results was absent or had to be ignored for some reason, it is noted that the first inspection requirement relates particularly to individual components, and could also be inspected at a lower assembly level.

For example, by the method of FIG. 2B, it would be possible to generate inspection requirements specifically for keycaps (triggered, e.g., by being a component with a keycap-type part number) annotated as amenable to be carried out at any of a plurality of hierarchical levels: e.g., on the raw keycap component itself, or after it had become part of the keyboard assembly.

An automated inspection planner would then have the option to recognize a synergy with other keyboard tests, e.g., in numbers of images that need to be acquired and/or numbers of inspection stations required. Potentially, it would accordingly select the fuller assembly stage as preferable for this inspection requirement.

As for the fourth requirement, there might, in some embodiments, be another "smart" downstream inspection agent preconfigured to produce optimal test plans for verifying keycap spacings. A brute force approach (e.g., without semantic awareness that this is really a "keyboard") could be to identify every single keycap edge, and check that it corresponds to an edge in the design documentation. This could lead to problems, e.g., when upper and lower edges of keys are confused, camera distortion is incorrectly accounted for, or perhaps performance problems in trying to test everything.

A smart inspection agent optionally tests differently, in ways tailored to its particular problem. For example, it could be configured to specifically exclude lower-body keycap edges as irrelevant, and/or to generate test lines along rows of keys which are positioned to quickly detect unevenness (e.g., due to key misplacement), while ignoring global distortions due to lens artifacts.

The inspection agent might be configured to accept a small number of basic parameters, for example, keycap inter-edge distances 514, 516 and center-to-center distance 515, 513 optionally extracted as annotations into the inspection requirements themselves (e.g., by inspection requirement preparer 128), or optionally extracted from the design hierarchy 120 by the inspection agent itself.

Some keycaps 501 will have different distances/shapes. If, for some reason, the keyboard inspection agent is not configured to deal with that itself, there are optionally test requirement annotations available to divide the keyboard up into uniform sections. Optionally, "closed" test requirements are generated for the few keys that may not fit into the available general rules.

Case Example

Reference is now made to FIG. 4, which schematically represents an image 600 of a portion of a computer casing 601, according to some embodiments of the present disclosure. Image 600 represents an image obtained by an automated visual inspection system.

In this instance, the trigger predicate could be a label (that is, text in the design documentation) that upper part 602 and lower part 603 together comprise a casing. Then the casing label becomes a trigger predicate for a group of requirements (from an inspection requirements library 124) which relate to casings.

In the keyboard example of FIG. 3, it was assumed for the sake of discussion that there was a globally aware keyboard agent embodying deep inspection knowledge of keyboards, and perhaps a keycaps agent.

In this example, it is assumed that there is no generic casing agent to draw on for performing inspection. Instead, the inspection requirement group is set up internally to specify appropriate tests drawn from a pool of more generic (but in this example, still semantically specified) tests. There may be, for example, a surface inspection agent, a color-check inspection agent, and a gap inspection agent.

In some embodiments, the needs met by the inspection group include the following, characteristic of a casing:

Outer surface inspections

Cross-component surface appearance similarity inspection (e.g., to avoid mismatched casing assemblies)

Inter-component gap inspection (e.g., of gap 604, specified in the design documentation to be of width 605 with some associated tolerance)

Each of these three is optionally generated as a separate inspection requirement, for example as follows.

From the assembly that generated trigger predicate casing, there may be selected all components with outer surfaces. This may be based on geometry, component name (e.g., panel or cover), or another criterion. To each of these components, an "inspect surface" requirement is assigned (at least to the outer surface). The requirement may be annotated as having a particular surface defect tolerance (comprising e.g., maximum scratch length, maximum average alteration in surface reflectance along a scratch, and/or other criteria, as appropriate to the surface inspection agent).

The same selected components (and surfaces) may furthermore be flagged as requiring a "same color", as implemented by the colorcheck inspection agent. This agent would be configured to verify similarities in color among a plurality of components; optionally including, for example, controlling for illumination angle, intensity, and surface angle of imaging.

Optionally, gaps (that is, as targets for inspection) are identified geometrically as being locations (in the design specifications) along outer surfaces where two components of the casing (identified, for example, as described above) extend along for some distance (e.g., at least 2 mm) within less than some threshold distance of each other (e.g., 2 mm). Optionally, adjustment is made as necessary for designed-in recesses, overlaps, and the like.

For all such gap regions, an inspection requirement is generated (e.g., by operations of inspection requirement preparer 128); for example an inspection requirement specifying the extent of gap to target, target minimum width, target maximum width, parallelism, similarity to a reference gap (measured from a "golden part", and/or other specified criteria.

Numeric annotations (parameters) are optionally derived from the design documentation itself. Alternatively, in some embodiments, a gap inspector derives parameters from images of a golden part.

Example Inspection Requirements Annotations

Following is an example of test requirement specifications (in XML) which are optionally generated for an assembly (PartSet element) comprising four components specified as Part elements: a Block and three screws labeled m3, m4 and m5.

```
<PartSet n="4">
    <Part id="4" label="Block">
        <Attributes n="3">
            <Inspection name="class" value="surface"/>
            <Inspection name="sub_class" value="class-b"/>
            <Inspection                  name="inspection"
                value="surface"/>
        </Attributes>
        <BodyIds n="1">
            <Id>5</Id>
        </BodyIds>
    </Part>
    <Part id="478" label="m3">
        <Attributes n="3">
            <Inspection name="class" value="screw"/>
            <Inspection name="sub_class" value="M3"/>
            <Inspection name="inspection" value="screw,
                existence, surface"/>
        </Attributes>
        <BodyIds n="1">
            <Id>479</Id>
        </BodyIds>
    </Part>
    <Part id="727" label="m4">
        <Attributes n="3">
            <Inspection name="class" value="screw"/>
            <Inspection name="sub_class" value="M4"/>
            <Inspection name="inspection" value="screw,
                existence, surface"/>
        </Attributes>
        <BodyIds n="1">
            <Id>728</Id>
        </BodyIds>
    </Part>
    <Part id="1206" label="m5">
        <Attributes n="3">
            <Inspection name="class" value="screw"/>
            <Inspection name="sub_class" value="M5"/>
            <Inspection name="inspection" value="screw,
                existence, surface"/>
```

```
        </Attributes>
        <BodyIds n="1">
            <Id>1207</Id>
        </BodyIds>
    </Part>
</PartSet>
```

Additional elements corresponding, e.g., to geometry of the various components are suppressed. The XML is potentially suitable for addition as an extension, to, e.g., a QIF-formatted MBD file. Once inserted to the MBD file, the test requirements may be propagated to any other design/manufacturing process; for example, it may influence later design revisions, and/or organization of manufacturing stations. The test requirements also have a primary role as inputs to a process of designing an inspection plan which satisfies the test requirements.

In the example, the Inspection elements are added to Attributes elements of each corresponding Part element. This is one method of linking inspection requirements (semantically specified, in this case) to design documentation.

The value of an Inspection element with the property definition name="class" corresponds to the denotation of the component (e.g., with a value property defined as surface or screw).

The value of an Inspection element with the property definition name="sub_class" corresponds to the annotations of the component (e.g., a value property, defined, for example, as class-b, M3, M4, or M5). For these sub-classes, there are assumed to be additional elements (which may be implemented, for example, by a downstream automated inspection agent) that describe the contents of those sub-classes. Optionally, details are provided as individual parameters and/or sub-elements of Inspection elements, rather than by reference as shown.

The value property of an Inspection element with name="inspection" is defined in correspondence with the concerns for inspection of the component (e.g., as surface, screw, or existence). These optionally refer to a particular downstream automated inspection agent which is specially configured to plan and/or perform inspections for the given inspection concern.

General

As used herein with reference to quantity or value, the term "about" means "within ±10% of".

The terms "comprises", "comprising", "includes", "including", "having" and their conjugates mean: "including but not limited to".

The term "consisting of" means: "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

The words "example" and "exemplary" are used herein to mean "serving as an example, instance or illustration". Any embodiment described as an "example" or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the present disclosure may include a plurality of "optional" features except insofar as such features conflict.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

Throughout this application, embodiments may be presented with reference to a range format. It should be understood that the description in range format is merely for convenience and brevity and should not be construed as an inflexible limitation on the scope of descriptions of the present disclosure. Accordingly, the description of a range should be considered to have specifically disclosed all the possible subranges as well as individual numerical values within that range. For example, description of a range such as "from 1 to 6" should be considered to have specifically disclosed subranges such as "from 1 to 3", "from 1 to 4", "from 1 to 5", "from 2 to 4", "from 2 to 6", "from 3 to 6", etc.; as well as individual numbers within that range, for example, 1, 2, 3, 4, 5, and 6. This applies regardless of the breadth of the range.

Whenever a numerical range is indicated herein (for example "10-15", "10 to 15", or any pair of numbers linked by these another such range indication), it is meant to include any number (fractional or integral) within the indicated range limits, including the range limits, unless the context clearly dictates otherwise. The phrases "range/ranging/ranges between" a first indicate number and a second indicate number and "range/ranging/ranges from" a first indicate number "to", "up to", "until" or "through" (or another such range-indicating term) a second indicate number are used herein interchangeably and are meant to include the first and second indicated numbers and all the fractional and integral numbers therebetween.

Although descriptions of the present disclosure are provided in conjunction with specific embodiments, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting. In addition, any priority document(s) of this application is/are hereby incorporated herein by reference in its/their entirety.

It is appreciated that certain features which are, for clarity, described in the present disclosure in the context of separate embodiments, may also be provided in combination in a single embodiment. Conversely, various features, which are, for brevity, described in the context of a single embodiment, may also be provided separately or in any suitable subcombination or as suitable in any other described embodiment of the present disclosure. Certain features described in the context of various embodiments are not to be considered essential features of those embodiments, unless the embodiment is inoperative without those elements.

What is claimed is:

1. A method of defining visual inspection requirements for a manufactured product, the method comprising:
   accessing a model-based definition (MBD) comprising a design model of the manufactured product, wherein the MBD specifies relationships between components of the manufactured part;
   identifying inspection requirements for components of the manufactured product, based on automatic analysis of relationships between components specified by the MBD; and
   encoding the identified inspection requirements for use in machine planning of visual inspection of the manufactured product.

2. The method of claim 1, wherein the MBD specifies hierarchical relationships of components specified in the design model, and the identifying inspection requirements is based on automatic analysis identifying particular hierarchical relationships of components specified by the MBD.

3. The method of claim 2, wherein the hierarchical relationships of components correspond to relationships among assemblies of the manufactured product.

4. The method of claim 1, wherein the identifying inspection requirements is based on automatic analysis identifying geometrical relationships of components specified by the MBD.

5. The method of claim 1, wherein the identifying inspection requirements comprises an automatic analysis which identifies a pattern of component properties specified by the MBD.

6. The method of claim 1, comprising generating, automatically, a visual inspection plan satisfying the inspection requirements; and carrying out the visual inspection plan on at least one instance of the manufactured product.

7. The method of claim 6, wherein the inspection requirements comprise open inspection requirements specifying a quality concern for inspection of one or more components specified by the MBD, without specification of characteristics or actions corresponding to the quality concern.

8. The method of claim 7, wherein the open requirements are semantic requirements.

9. The method of claim 7, wherein the generating the visual inspection plan comprises converting, automatically, the open inspection requirements into corresponding closed inspection requirements which specify characteristics of the components and measurement actions for those characteristics.

10. The method of claim 9, wherein the generating the visual inspection plan comprises using at least one of (1) hierarchical relationships specified by the MBD and (2) geometrical information specified by the MBD to determine a stage at which to perform actions that satisfy the inspection requirement.

11. The method of claim 1, wherein the encoding comprises inserting inspection-specifying data elements into the MBD.

12. The method of claim 11, wherein the MBD is specified as one or more QIF files, and the inspection-specifying data elements are defined using references to elements of the one or more QIF files.

13. The method of claim 11, comprising adjusting a manufacturing plan based on the inserted inspection-specifying data elements.

14. The method of claim 1, wherein the identifying comprises selecting inspection requirements from a predefined inspection requirements library, based on analysis of hierarchical relationships specified between components defined in the MBD.

15. The method of claim 14, comprising modifying the selecting according to a conditioning input; wherein the conditioning input describes a factory condition related to one or more of part inventory, part source, tooling state, tooling availability, state of worker training, and labor allocation.

16. The method of claim 1, wherein the inspection requirements are open inspection requirements selected based on an identification in the MBD of a trigger predicate which denominates an assembly as belonging to a class for which a semantic inspection agent is available.

17. The method of claim 1, wherein the MBD specifies geometrical relationships between components of the manufactured part, and the identifying comprises identifying based on automatic analysis of the geometrical relationships between the components specified by the MBD.

18. The method of claim 1, wherein the MBD specifies semantic information associated with components of the manufactured product, and the identifying further comprises identifying based on automatic analysis of the semantic information associated with the components.

19. The method of claim 1, wherein the identifying comprises: (i) identifying a predicate trigger based on the analyzed relationships, and (ii) selecting inspection requirements from an inspection requirements library in response to the predicate trigger.

20. A system for defining visual inspection requirements for a manufactured product, the system comprising a computer processor and memory, wherein the computer processor is configured to access instructions in the memory medium which instruct it to:

access, from the memory, a model-based definition (MBD) comprising a design model of the manufactured product, wherein the MBD specifies relationships between components of the manufactured product;

identify inspection requirements for components of the manufactured product, based on automatic analysis of relationships between components specified by the MBD; and encode the identified inspection requirements for use in machine planning of visual inspection of the manufactured product.

21. The system of claim 20, wherein the MBD comprises one or more QIF-formatted files.

22. The system of claim 20, wherein the identified inspection requirements are encoded as XML files.

23. The system of claim 20, wherein the MBD specifies hierarchical relationships of components specified in the design model and corresponding to relationships among assemblies of the manufactured product, and the computer processor identifies inspection requirements by identifying particular hierarchical relationships of components specified by the MBD.

24. A method of defining visual inspection requirements for a manufactured product, the method comprising:

accessing a model-based definition (MBD) comprising a design model of the manufactured product;

identifying inspection requirements for components of the manufactured product, based on automatic analysis of relationships between components specified by the MBD;

encoding the identified inspection requirements for use in machine planning of visual inspection of the manufactured product, wherein the inspection requirements comprise open inspection requirements specifying a quality concern for inspection of one or more components specified by the MBD, without specification of characteristics or actions corresponding to the quality concern; and generating, automatically, a visual inspection plan satisfying the inspection requirements; and carrying out the visual inspection plan on at least one instance of the manufactured product.

* * * * *